United States Patent
Becker, III et al.

(10) Patent No.: US 9,318,283 B2
(45) Date of Patent: Apr. 19, 2016

(54) APPARATUS INCLUDING A CIRCUIT BREAKER ADAPTED TO SELECTIVELY PROVIDE ARC FLASH PROTECTION IN CONNECTION WITH A WIND TURBINE

(71) Applicant: SIEMENS AKTIENGESELLSCHAFT, München (DE)

(72) Inventors: Edmund B. Becker, III, Lake Mary, FL (US); Robert J. Nelson, Orlando, FL (US)

(73) Assignee: SIEMENS AKTIENGESELLSCHAFT, München (DE)

(*) Notice: Subject to any disclaimer, the term of this patent is extended or adjusted under 35 U.S.C. 154(b) by 88 days.

(21) Appl. No.: 14/284,664

(22) Filed: May 22, 2014

(65) Prior Publication Data

US 2015/0340180 A1    Nov. 26, 2015

(51) Int. Cl.

| | |
|---|---|
| H02H 3/00 | (2006.01) |
| H01H 33/04 | (2006.01) |
| H01H 83/10 | (2006.01) |
| H01F 30/00 | (2006.01) |
| F03D 11/00 | (2006.01) |
| H02H 1/00 | (2006.01) |
| F03D 9/00 | (2006.01) |
| H01H 9/50 | (2006.01) |
| H02P 101/15 | (2015.01) |

(52) U.S. Cl.
CPC ............... *H01H 33/04* (2013.01); *F03D 9/003* (2013.01); *F03D 11/00* (2013.01); *H01F 30/00* (2013.01); *H01H 83/10* (2013.01); *H02H 1/0015* (2013.01); *H02H 3/006* (2013.01); *H01H 9/50* (2013.01); *H02P 2101/15* (2015.01); *Y02E 10/722* (2013.01)

(58) Field of Classification Search
USPC .......................................... 361/42, 44, 86–87
See application file for complete search history.

(56) References Cited

U.S. PATENT DOCUMENTS

| | | |
|---|---|---|
| 7,203,040 B2 | 4/2007 | Shipp et al. |
| 7,292,422 B2 | 11/2007 | Culligan et al. |
| 7,889,474 B2 | 2/2011 | Weiher et al. |

(Continued)

FOREIGN PATENT DOCUMENTS

WO    2008077161 A1    7/2008

OTHER PUBLICATIONS

Eaton Corporation, "Arc Flash Energy Reduction Techniques Energy-Reducing Maintenance Switching", ® 2011 Eaton Corporation, Publication No. TP08324002E, Feb. 2011.

*Primary Examiner* — Danny Nguyen

(57) ABSTRACT

Apparatus to provide arc flash protection regarding a wind turbine. In one embodiment, a wind turbine (10) includes a wind turbine generator (12) to generate an alternating current power. A transformer (14) has a high-voltage side (16) coupled to a load. A circuit breaker (18) is adapted to selectively reduce arc flash energy available to the wind turbine. The circuit breaker may be arranged to provide circuit interruption between the generator and a low-voltage side (20) of the transformer upon detection of a fault condition. The circuit breaker includes an arc flash protection mode (24) and a normal protection mode (22). In response to a sensed condition, a respective one of the modes may be automatically set so that the circuit breaker can perform the circuit interruption in accordance with the protection functionality of the set mode.

18 Claims, 2 Drawing Sheets

(56) References Cited

U.S. PATENT DOCUMENTS

| | | |
|---|---|---|
| 7,944,068 B2 | 5/2011 | Wagoner et al. |
| 8,351,171 B2 | 1/2013 | Payack |
| 2009/0322083 A1 * | 12/2009 | Wagoner ............... H02J 3/38 290/44 |
| 2010/0133922 A1 | 6/2010 | Payack |
| 2013/0063871 A1 | 3/2013 | Weiher et al. |

* cited by examiner

APPARATUS INCLUDING A CIRCUIT BREAKER ADAPTED TO SELECTIVELY PROVIDE ARC FLASH PROTECTION IN CONNECTION WITH A WIND TURBINE

FIELD OF THE INVENTION

The invention relates generally to wind turbines and, more particularly, to an apparatus including a circuit breaker adapted to selectively provide arc flash protection in connection with a wind turbine.

BACKGROUND OF THE INVENTION

Wind turbines use naturally-available wind energy to generate electricity in an environmentally-friendly manner. Utility grade wind turbines (e.g., wind turbines designed to provide electrical power to a utility grid) can develop substantially high-levels of arc flash hazard when connected to the grid. An arc flash hazard, as presently defined by a standard titled "Electrical Safety in the Workplace (NFPA 70E), refers to "a dangerous condition associated with the possible release of energy caused by an electrical arc".

The electrical arc can generate substantially high temperatures and create a pressure wave, not unlike an explosion, causing metal particles, equipment parts and other loose items to be expelled from the electrical arc flash area in addition to the expulsion of hot, ionized gases. If a human being is present in the vicinity of such arc flash hazard, bodily injury, or worse can result. Applicable governmental regulations, as well as applicable electric codes, specify warnings, markings, and personnel protection equipment (PPE), such as clothing, goggles, gloves, etc., that are designed to protect personnel working in such arc flash areas. However, for electrical equipment interconnected to the grid, arc flash levels can exceed multiple times the maximum level of protection afforded by such PPE. In view of the foregoing considerations, a cost-effective and reliable solution for arc flash protection in the context of wind turbines is needed. Disclosed embodiments are believed to successfully address at least such needs.

BRIEF DESCRIPTION OF THE DRAWINGS

The invention is explained in the following description in view of the drawings that show.

DETAILED DESCRIPTION OF THE INVENTION

The present inventors have cleverly recognized that certain known techniques for ameliorating arc flash hazards in connection with wind turbines can be substantially burdensome and/or costly. For example, removing a circuit connection to the power grid by disconnecting a step-up transformer that connects a given wind turbine to the grid can entail various disadvantages. Firstly, disconnecting such a step-up transformer may be substantially burdensome since such a transformer is generally only disconnectable on its high-voltage side (as may involve in one example application a voltage level of approximately 34.5 kV), which in turn requires the involvement of a technician appropriately qualified to service electrical equipment carrying such voltage levels. Secondly, the disconnection of such a transformer may also entail disconnection of the collector system associated with the given turbine (in one example application the collector system may comprise a feeding string of up to 15 wind turbines). That is, the entire string of wind turbines may be temporarily taken out of service, which can detrimentally affect the power generation capability of the wind park.

In view of such a recognition, the present inventors propose an innovative apparatus including a cost-effective and reliable device, such as a circuit breaker adapted to selectively provide arc flash protection in connection with a given wind turbine so that personnel can—with reduced exposure to arc flash energy—perform servicing operations, as may involve servicing of electric panels and/or electric equipment that may be disposed inside the relatively tight spacing of the tower of the wind turbine.

In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent unless otherwise so described. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

Figure 1:
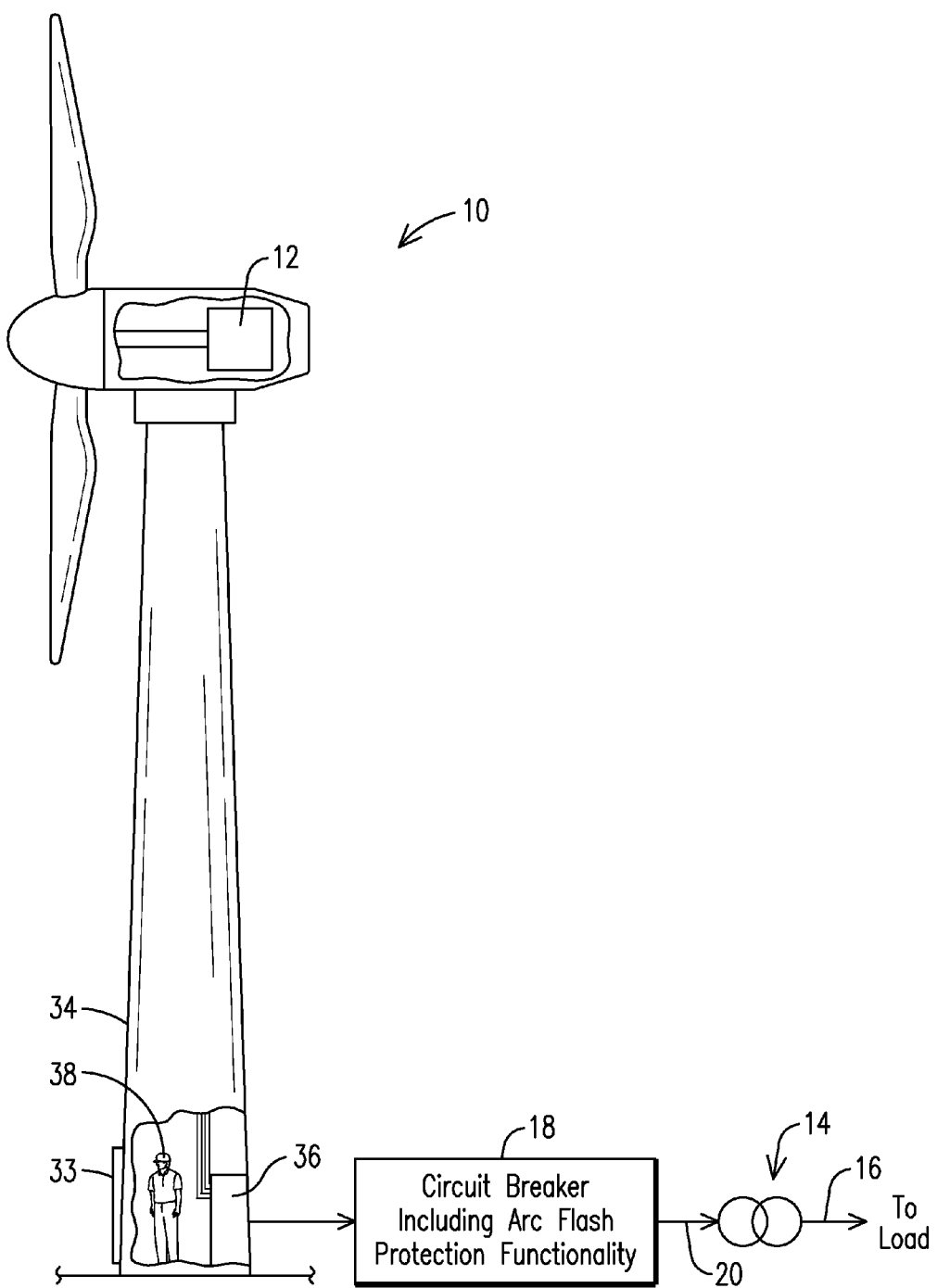
FIG. 1 is a schematic representation of a wind turbine that can benefit from an apparatus embodying aspects of the present invention.
Figure 3:
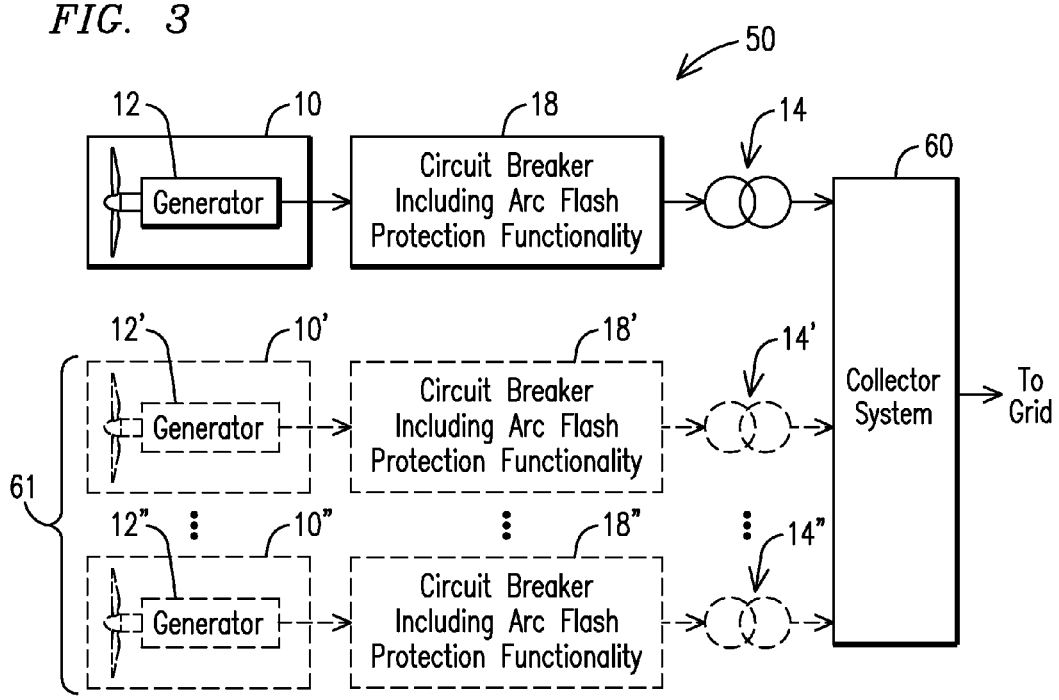
FIG. 3 is a schematic representation of plurality of wind turbines connected to a collector system, where such wind turbines can individually benefit from respective apparatuses embodying aspects of the present invention.

FIG. 1 is a schematic representation of a wind turbine 10 that can benefit from an apparatus embodying aspects of the present invention. Wind turbine 10 includes a wind turbine generator 12 configured to generate an alternating current (AC) power output. A transformer 14, such as a local step-up transformer, has a high-voltage side 16 coupled to a load, such as a collector system 60 in a wind park 50 (FIG. 3). As will be described in greater detail below, a circuit breaker 18 is adapted to selectively provide arc flash protection functionality in connection with wind turbine 10. In one non-limiting embodiment, this protection may be realized by way of reducing the amount of arc flash energy available to the wind turbine.

Figure 2:
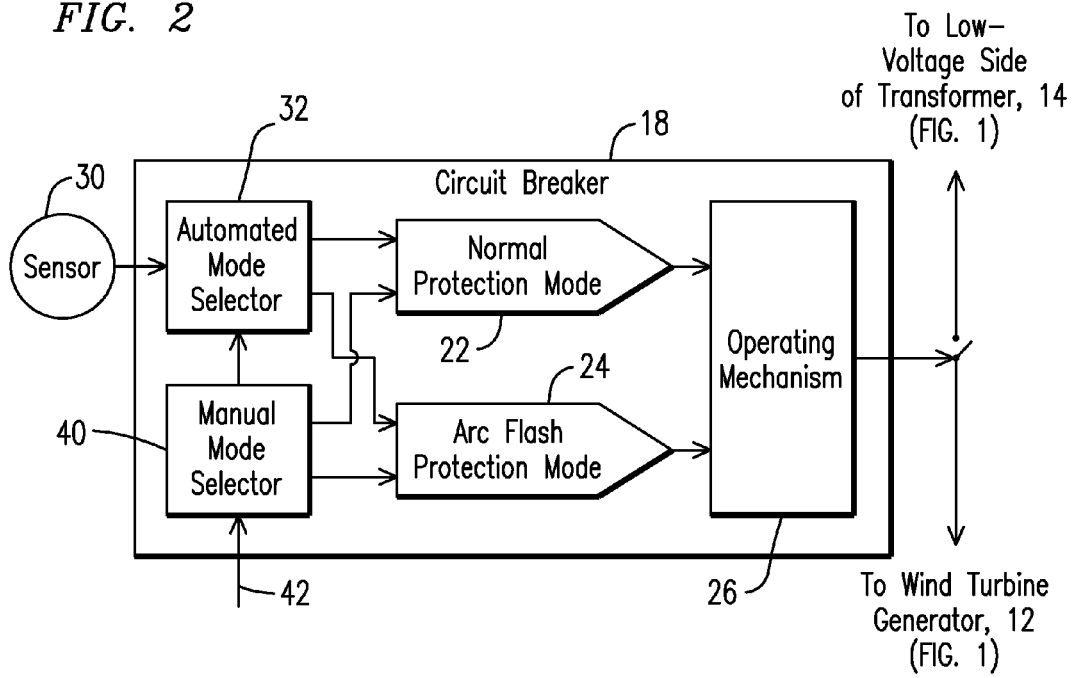
FIG. 2 is a schematic representation of a disclosed circuit breaker including an arc flash protection mode and a normal protection mode.

In one non-limiting embodiment, circuit breaker 18 is arranged to provide circuit interruption between wind turbine generator 12 and a low-voltage side 20 of transformer 14 upon detection of a fault condition. In one non-limiting embodiment, as illustrated in FIG. 2, circuit breaker 18 comprises a normal protection mode 22 and an arc flash protection mode 24. For example, in response to a sensed condition, a respective one of the modes may be automatically set so that an operating mechanism 26 of circuit breaker 18 can perform the circuit interruption in accordance with the protection functionality of the set mode.

In one non-limiting embodiment, the arc flash protection mode 24 may be configured so that circuit breaker 18 may interrupt a short circuit current over a relatively quicker time interval. In one non-limiting example, the arc flash protection mode 24 may comprise a clearing time of approximately half-cycle or less. By way of comparison, the clearing time associated with the normal protection mode 22 in one non-limiting example may range from approximately eight cycles to approximately ten cycles. As will be appreciated by those skilled in the art, since at a given distance the arc flash energy is a function of the product of the square of the fault current and the arc duration (i.e., time), appropriately reducing the arc duration can decrease the arc flash energy to a level that may be safely accommodated with PPE.

In one non-limiting embodiment, at least one sensor 30 is coupled to an automated mode selector 32 of circuit breaker 18 for automatically setting in response to the sensed condition the arc flash protection mode or the normal protection mode. That is, either the arc flash protection mode or the normal protection mode may be automatically selected during appropriate situations or conditions.

The description below provides various non-limiting examples of sensing arrangements and/or sensing modalities that may be employed individually or in combination to sense various non-limiting example conditions for automatically setting the arc flash protection mode or the normal protection mode. Sensor 30 may be configured to sense whether AC power output is being generated by wind turbine generator 20 so that, for example, when wind turbine generator 12 is not generating power, the arc flash protection mode 24 is automatically set. Conversely, once wind turbine generator 12 resumes power generation, circuit breaker 18 can automatically revert to the normal protection mode 22. Sensor 30 may be configured to sense a condition of a door 33 that provides access into a tower 34 of wind turbine 10. Sensor 30 may configured to sense a condition indicative of access or proximity to a serviceable electric panel 36 of wind turbine 10. Sensor 30 may be configured to sense a presence of a human being 38 in a predefined area (e.g., a boundary area) of wind turbine 10. Without limitation, sensor 30 may comprise an electrical sensor, an optical sensor, an ultrasound sensor, a motion sensor, and a combination of two or more of such sensors.

In one non-limiting embodiment, circuit breaker 18 may further include a manual mode selector 40 adapted to override operation of the automated mode selector 32. For example, one or more key switches (schematically represented by arrow 42) may be used to override automated mode selector 32 and manually set the arc flash protection mode or the normal protection mode. For example, one can override the automated mode selector so that the arc flash protection mode 24 is disengaged although sensor 30 may not be sensing power generation by wind turbine generator 12.

FIG. 3 is a schematic representation of a plurality of wind turbines connected to a collector system 60 where each of such wind turbines can individually benefit from respective apparatuses embodying aspects of the present invention. FIG. 3 may represent a portion of a wind park 50, where wind turbine 10 includes arc flash protection functionality provided by way of circuit breaker 18 interconnected between generator 12 and the low-voltage side of transformer 14, as disclosed above in the context of FIGS. 1 and 2.

In this non-limiting embodiment, wind turbine 10 in combination with further wind turbines 61 (schematically represented by bracket 61) comprise a plurality of wind turbines connected to feed collector system 60, which in turn may be connected to the grid. In this non-limiting embodiment, the further wind turbines 61 may be arranged to include respective circuit breakers 18', 18" adapted to selectively provide individualized arc flash protection in connection with the further wind turbines 61. For example, circuit breaker 18' is interconnected between the low-voltage side of transformer 14' and the wind turbine generator of an associated wind turbine from further wind turbines 61. That is, the protective functionality of respective circuit breakers 18', 18" with respect to its associated wind turbine is practically identical to the protection functionality provided by circuit breaker 18 with respect to wind turbine 10, and such functionality will not be repeated to spare the reader from pedantic and unnecessary disclosure. This arrangement is advantageous since any respective one of the wind turbines that feeds collector system 60 may be serviced with a relatively higher degree of protection—as may involve servicing of electric panels and/or electric equipment—when the arc flash protection mode is set in its respective circuit breaker without having to disconnect the entire string of wind turbines connected to the collector system.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus comprising:
   a wind turbine comprising a wind turbine generator configured to generate an alternating current (AC) power output;
   a transformer having a high-voltage side coupled to a load;
   a circuit breaker adapted to selectively reduce arc flash energy available to the wind turbine, the circuit breaker arranged to provide circuit interruption between the wind turbine generator and a low-voltage side of the transformer upon detection of a fault condition, the circuit breaker having an arc flash protection mode and a normal protection mode, wherein, in response to a sensed condition, a respective one of the modes is automatically set so that the circuit breaker can perform the circuit interruption in accordance with a protection functionality of the set mode; and
   at least one sensor coupled to an automated mode selector of the circuit breaker for automatically setting in response to the sensed condition the arc flash protection mode or the normal protection mode.

2. The apparatus of claim 1, wherein the at least one sensor is configured to sense whether AC power output is being generated by the wind turbine generator.

3. The apparatus of claim 1, wherein the at least one sensor is configured to sense a condition of a door that provides access into a tower of the wind turbine.

4. The apparatus of claim 1, wherein the at least one sensor is configured to sense a condition indicative of access or proximity to a serviceable electric panel of the wind turbine.

5. The apparatus of claim 1, wherein the at least one sensor is configured to sense a presence of a human being in a predefined area of the wind turbine.

6. The apparatus of claim 1, further comprising a manual mode selector adapted to override the automated mode selector.

7. The apparatus of claim 6, wherein the manual mode selector comprises a key switch.

8. The apparatus of claim 1, wherein the at least one sensor comprises a sensor selected from the group consisting of an electrical sensor, an optical sensor, an ultrasound sensor, a motion sensor, and a combination of two or more of said sensors.

9. An apparatus comprising:
a wind turbine comprising a wind turbine generator configured to generate an alternating current (AC) power output;
a transformer having a high-voltage side coupled to a load; and
a circuit breaker adapted to selectively reduce arc flash energy available to the wind turbine, the circuit breaker arranged to provide circuit interruption between the wind turbine generator and a low-voltage side of the transformer upon detection of a fault condition, the circuit breaker having an arc flash protection mode and a normal protection mode, wherein, in response to a sensed condition, a respective one of the modes is automatically set so that the circuit breaker can perform the circuit interruption in accordance with a protection functionality of the set mode,
wherein the load comprises a collector system fed by the wind turbine and further wind turbines.

10. The apparatus of claim 9, wherein the further wind turbines comprise respective circuit breakers adapted to selectively provide individualized arc flash protection in connection with the further wind turbines.

11. An apparatus comprising:
a transformer having a high-voltage side coupled to a load;
a circuit breaker arranged to provide circuit interruption between a wind turbine generator of a wind turbine and a low-voltage side of the transformer upon detection of a fault condition, the circuit breaker comprising an arc flash protection mode and a normal protection mode, wherein, in response to a sensed condition, a respective one of the modes is automatically set so that the circuit breaker can perform the circuit interruption in accordance with a protection functionality of the set mode; and
at least one sensor coupled to a mode selector of the circuit breaker for automatically setting in response to the sensed condition the arc flash protection mode or the normal protection mode.

12. The apparatus of claim 11, wherein the at least one sensor is configured to sense whether AC power output is being generated by the wind turbine generator.

13. The apparatus of claim 11, wherein the at least one sensor is configured to sense a condition of a door that provides access into a tower of the wind turbine.

14. The apparatus of claim 11, wherein the at least one sensor is configured to sense a condition indicative of access or proximity to a serviceable electric panel of the wind turbine.

15. The apparatus of claim 11, wherein the at least one sensor is configured to sense a presence of a human being in a predefined area of the wind turbine.

16. The apparatus of claim 11, further comprising a manual mode selector adapted to override the mode selector for automatically setting the arc flash protection module or the normal protection module.

17. The apparatus of claim 16, wherein the manual selector comprises a key switch.

18. An apparatus comprising:
a transformer associated with a respective one of a plurality of wind turbines, the transformer having a high-voltage side coupled to a collector system fed by the plurality of wind turbines;
a circuit breaker adapted to selectively reduce arc flash energy available to the respective one wind turbine, the circuit breaker arranged to provide circuit interruption between a wind turbine generator of the respective one wind turbine and a low-voltage side of the transformer upon detection of a fault condition, the circuit breaker comprising an arc flash protection mode and a normal protection mode, wherein, in response to a sensed condition, a respective one of the modes is automatically set so that the circuit breaker can perform the circuit interruption in accordance with a protection functionality of the set mode; and
at least one sensor coupled to an automated mode selector of the circuit breaker for automatically setting in response to the sensed condition the arc flash protection mode or the normal protection mode,
wherein further ones of the plurality of wind turbines that feed the collector system comprise respective circuit breakers adapted to selectively and individually reduce arc flash energy available to the further ones of the plurality of wind turbines.

* * * * *